United States Patent [19]
Karandikar et al.

[11] Patent Number: 5,462,591
[45] Date of Patent: Oct. 31, 1995

[54] HYPERTHERMOGELLING AQUEOUS PHASE CHANGE INKS AND METHODS FOR USING THEM IN AN INK JET PRINTER

[75] Inventors: B. M. Karandikar, Lake Oswego; Loc V. Bui, Portland; Hue P. Le, Beaverton, all of Oreg.

[73] Assignee: Tektronix, Inc., Wilsonville, Oreg.

[21] Appl. No.: 239,105

[22] Filed: May 6, 1994

[51] Int. Cl.$^6$ .................................................. C09D 11/02
[52] U.S. Cl. ................ 106/20 R; 106/22 F; 106/22 H; 106/23 F; 106/23 H; 106/26 R
[58] Field of Search ........................ 106/20 R, 26 R, 106/22 F, 23 F, 22 H, 23 H

[56] References Cited

U.S. PATENT DOCUMENTS

| | | | |
|---|---|---|---|
| 4,072,644 | 2/1978 | Hedrick | 260/29.6 |
| 4,137,083 | 1/1979 | Hedrick | 106/20 |
| 4,222,740 | 9/1980 | Bohm et al. | 8/488 |
| 4,308,061 | 12/1981 | Iwahashi et al. | 106/22 H |
| 4,321,870 | 3/1982 | Zasloff | 101/473 |
| 4,454,279 | 6/1984 | Ong et al. | 524/376 |
| 4,474,751 | 10/1984 | Haslam et al. | 424/78 |
| 4,508,570 | 4/1985 | Fujii et al. | 106/20 D |
| 4,523,922 | 6/1985 | Ong et al. | 8/471 |
| 4,671,691 | 6/1987 | Case et al. | 106/22 F |
| 4,851,393 | 7/1989 | Rha et al. | 514/54 |
| 4,908,063 | 3/1990 | Baker et al. | 106/22 R |
| 4,923,515 | 5/1990 | Koike et al. | 106/20 D |
| 4,938,801 | 7/1990 | Yoshioka et al. | 106/20 R |
| 4,963,188 | 10/1990 | Parker | 106/20 |
| 5,008,108 | 4/1991 | Rha et al. | 424/401 |
| 5,021,802 | 6/1991 | Allred | 346/1.1 |
| 5,124,718 | 6/1992 | Koike et al. | 106/20 D |
| 5,151,128 | 9/1992 | Fukushima et al. | 106/20 R |
| 5,156,675 | 10/1992 | Breton et al. | 106/22 R |
| 5,174,815 | 12/1992 | Kondo et al. | 106/20 R |
| 5,238,783 | 8/1993 | Taniguchi et al. | 430/281 |
| 5,356,464 | 10/1994 | Hickman et al. | 106/22 H |

FOREIGN PATENT DOCUMENTS 5927742  7/1993  European Pat. Off. .

OTHER PUBLICATIONS

" Temperature–Independent Isoviscous Effect in Ternary Systems of Water Tetronic 1307, and Hema", M. G. Fakes, A. R. Mlodozeniec, G. M. Zentner, Journal of Colloid and Interface Sciences, vol. 138, No. 2, Sep. 1990, pp. 505–514.

Primary Examiner—Helene Klemanski
Attorney, Agent, or Firm—Ralph D'Alessandro

[57] ABSTRACT

An aqueous phase change ink contains a selected concentration of hyperthermogelling component that causes the ink to gel when its temperature is increased to its thermo-inversion point or when the concentration of the hyperthermogelling component is increased by evaporation, or substrate absorption, of water from the ink. The ink may be jetted directly onto a heated and/or absorptive substrate or jetted onto a cooler and/or hydrophobic surface before being transferred to the substrate. The thermo-inversion point is preferably about ambient temperature, and the preferred hyperthermogelling component is a nonionic surfactant, such as an ethylene oxide propylene oxide block copolymer surfactant.

36 Claims, 3 Drawing Sheets

HYPERTHERMOGELLING AQUEOUS PHASE CHANGE INKS AND METHODS FOR USING THEM IN AN INK JET PRINTER

TECHNICAL FIELD

This invention relates to phase change inks and, in particular, to methods for printing such inks employing hyperthermogelling components that reduce feathering.

BACKGROUND OF THE INVENTION

In general, conventional phase change inks are in the solid phase at ambient temperature, but exist in the liquid phase at an elevated operating temperature of an ink jet printing device. At the jet operating temperature, droplets of liquid ink are ejected from the printing device and, when the ink droplets contact the surface of the printing medium, they quickly solidify to form a predetermined pattern of solidified ink dots.

More recently impulse inks or bubble jet inks have been disclosed in U.S. Pat. No. 5,021,802. These inks comprise an aqueous sol-gel medium and coloring agents. The inks are thermally reversible sol-gels and exhibit conventional phase change ink behavior such that they are gels (solids) at ambient temperatures and sols (liquids) at elevated temperatures between about 40°–100° C.

An inherent problem associated with aqueous inks employed in drop-on-demand color printers is "feathering" of ink drops after placement onto a substrate such as paper. Feathering is the undesirable nonuniform dispersal or wicking of ink drops along the paper fibers after the inks are placed on the print medium. Feathering may cause intercolor bleeding, poor resolution, and image degradation adversely affecting the print quality. Attempts to resolve this problem include the use of cosolvents to reduce drying time, the use of latex-based inks, the addition of zwitterionic surfactants, the use of pigmented inks, and the use of solid inks. Although solid inks tend not to feather when printed, their implementation significantly increases the cost and complexity of the equipment needed to print such inks.

SUMMARY OF THE INVENTION

An object of the invention is, therefore, to reduce image degradation associated with the printing of aqueous inks.

Another object of this invention is to provide a means for reducing the cost and complexity of printer architecture associated with printing conventional phase change inks.

The present invention employs aqueous phase change inks containing water soluble compounds that exhibit thermo-inversion properties, by which is meant compounds whose water solubility decreases as the solution temperature increases. When ink solutions of these selected compounds are heated to their thermo-inversion points, they exhibit hyperthermogelling properties where these selected compounds undergo a phase transition to form discrete, stable gels. In the present invention this occurs in ink dot gels.

At low concentrations, aqueous solutions of these hyperthermogelling compounds exhibit moderate viscosities. However, at a critical concentration of a particular hyperthermogelling compound, a small increase in the concentration of the compound or the temperature of the solution causes a rapid increase in viscosity, ultimately leading to complete gelling of the solution. These effects of temperature and concentration are exploited to make novel ambient phase change inks that gel instantly on contact with a relatively heated or absorptive substrate. Hyperthermogelling compounds include, but are not limited to, homopolymers, copolymers, nonpolymeric surfactants, and their derivatives. Compounds exhibiting this hyperthermogelling phenomenon at or above ambient temperature are preferred. An ink composition of such a compound can be jetted at ambient temperature and gels instantly on an unheated substrate to produce unfeathered ink dots.

BRIEF DESCRIPTION OF THE DRAWINGS

These and other objects, features and advantages of the present invention will become apparent upon consideration of the following detailed description of preferred embodiments of the invention, especially when taken in conjunction with the accompanying drawings wherein.

DETAILED DESCRIPTION OF PREFERRED EMBODIMENTS

Figure 1:
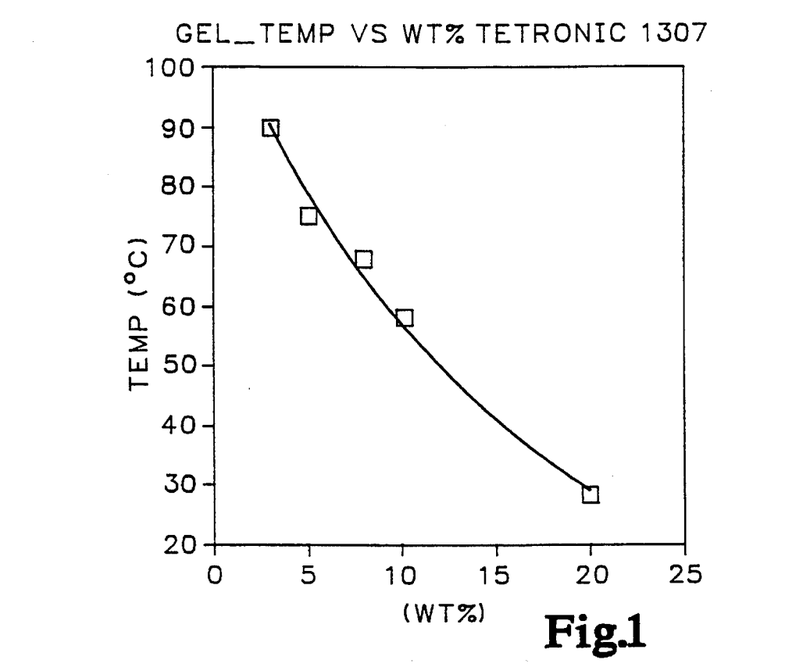
FIG. 1 is a graphical representation of the gelation temperature as a function of concentration of a preferred hyperthermogelling component.

In a preferred embodiment of the present invention, a hyperthermogelling aqueous phase change ink includes a nonionic surfactant. Nonionic surfactants, such as TETRONIC® 1307, exhibit good thermo-inversion gelling properties. FIG. 1 shows a graphical representation of the gelation temperature, i.e. the thermo-inversion point, of various concentrations of TETRONIC® 1307 surfactant. For example, TETRONIC® 1307 surfactant, having a molecular weight of 17,000, gels at about 30° C. at its critical concentration (about 13% by weight). Aqueous phase change ink compositions having a coloring agent and a hyperthermogelling component can have that hyperthermogelling component have a concentration of between about 0.05% by weight to about its critical concentration.

TETRONIC® 1307 surfactant is a polyoxamine, having an alkyldiamine center (ethylene diamine, where w=2), a hydrophobic core of y propylene oxide units, and hydrophilic en s of x ethylene oxide units, as shown below:

TETRONIC® 1307 is an ethylene oxide propylene oxide block copolymer surfactant available commercially from BASF Corporation of Parsippany, N.J. In the present invention the hydrophobic moiety, when the solution is heated, clusters together to form a skeletal network of a continuous matrix swollen in a liquid phase, water. The hydrophilic moiety interacts with water through hydrogen bonding to form a gel. Block copolymer gels are hypothesized to be formed by hydrogen bonding in aqueous systems through the ether oxygen atoms with water protons.

Figure 2:
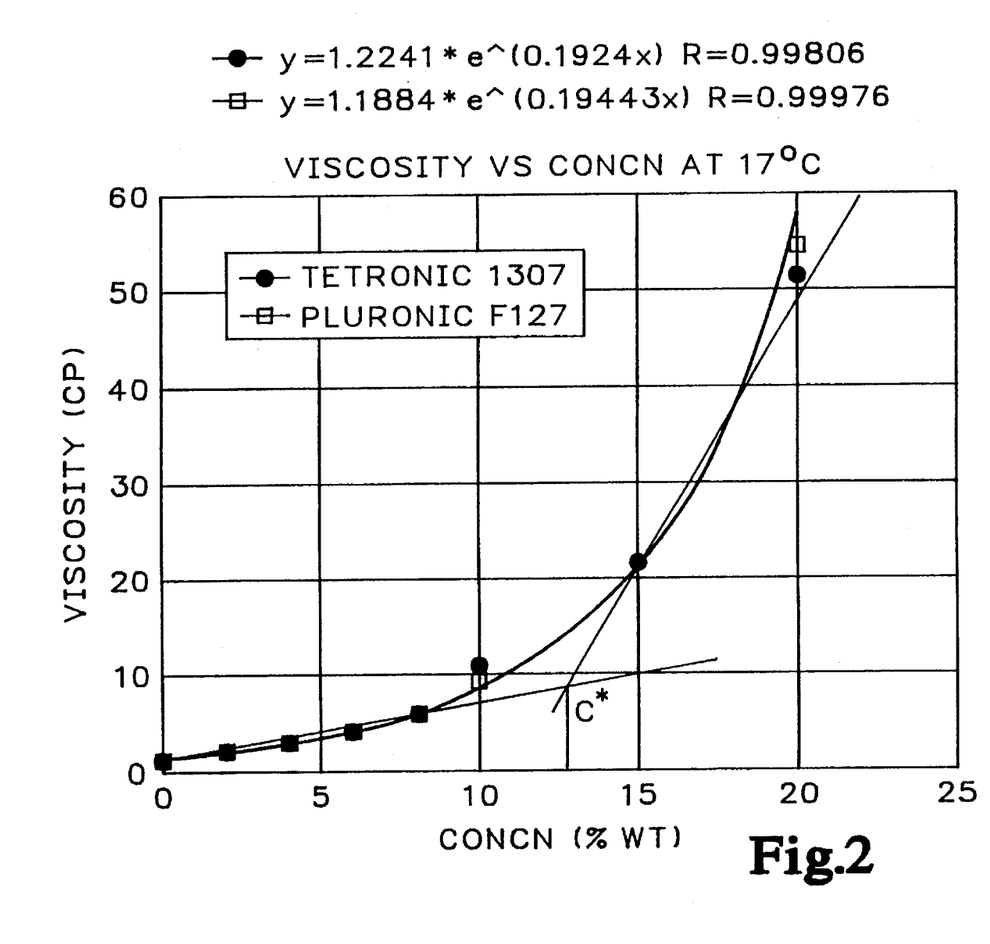
FIG. 2 is a graphical representation of the viscosity as a function of concentration of two hyperthermogelling components that are block copolymers of ethylene oxide and propylene oxide.

The viscosity and surface tension of aqueous solutions of TETRONIC® 1307 surfactant at different concentrations are shown in Table I and are graphically represented in FIG. 2.

TABLE I

| | Viscosity and Surface Tension Tetronic 1307/H$_2$O Solutions at 15–16° C. | | |
|---|---|---|---|
| Solution | Conc. of T-1307 (% W/W) | μ(cP.) | γ(dynes/cm) |
| A | 2 | 1.90 | 41.27 |
| B | 4 | 2.76 | 38.20 |
| C | 6 | 3.98 | 38.13 |
| D | 8 | 5.62 | 37.84 |
| E | 10 | 10.60 | 38.25 |
| F | 15 | 21.30 | 38.87 |
| G | 20 | 51.40 | 39.99 |
| H$_2$O | 0 | 1.0 | 71.86 |

The solutions A–G were prepared with weighed amounts of distilled water and TETRONIC® 1307 surfactant and were stirred overnight at 15°–16° C. to obtain clear solutions. The surface tension measurements were made on a Cahn dynamic contact angle instrument. The viscosity (centipoise (cP)) measurements were obtained with a Brookfield Thermosel viscometer at a spindle speed of about 60 rpm.

With reference to the previously depicted TETRONIC® surfactant structural formula, skilled persons will appreciate that numerous homologs of the surfactant may be employed. Preferred homologs contain about 10% to about 80% poly(oxyethylene) and about 20% to about 60% poly(oxypropylene) where w is an integer from 2 to 6 and x and y are any integers that satisfy the weight percent and molecular weight ranges and have a molecular weight of about 1,000 to about 50,000. Skilled persons will appreciate that homologs of the following structural formula are also preferred subject to the same weight percent and molecular weight ranges:

A preparation of a hyperthermogelling aqueous phase change ink made with TETRONIC® 1307 surfactant, having a molecular weight of about 17,000, is described below in Example I.

EXAMPLE I

A test ink solution was prepared by the following procedure. About a 9% by weight solution of TETRONIC® 1307 surfactant in distilled water was prepared at about 15°– 16° C., mixed for about 12 hours to achieve complete dissolution, and filtered through a 0.2 micron filter. Two humectants, PEG 200, polyethylene glycol of molecular weight 200, at about 3% by weight and monoethanol acetamide commerically available from Croda Inc. of New York, N.Y., at about 5% by weight were added to the solution. An Acid Blue 9 (a common dye) solution of about 100 mg to about 1 ml was added to the surfactant solution and uniformly mixed to yield a cyan ink composition of about 9% weight by volume of TETRONIC® 1307 surfactant.

The cyan ink was jetted from a PZT driven single jet at about 20° C. The jet printed several dotted lines on a plain paper.

Figure 3:
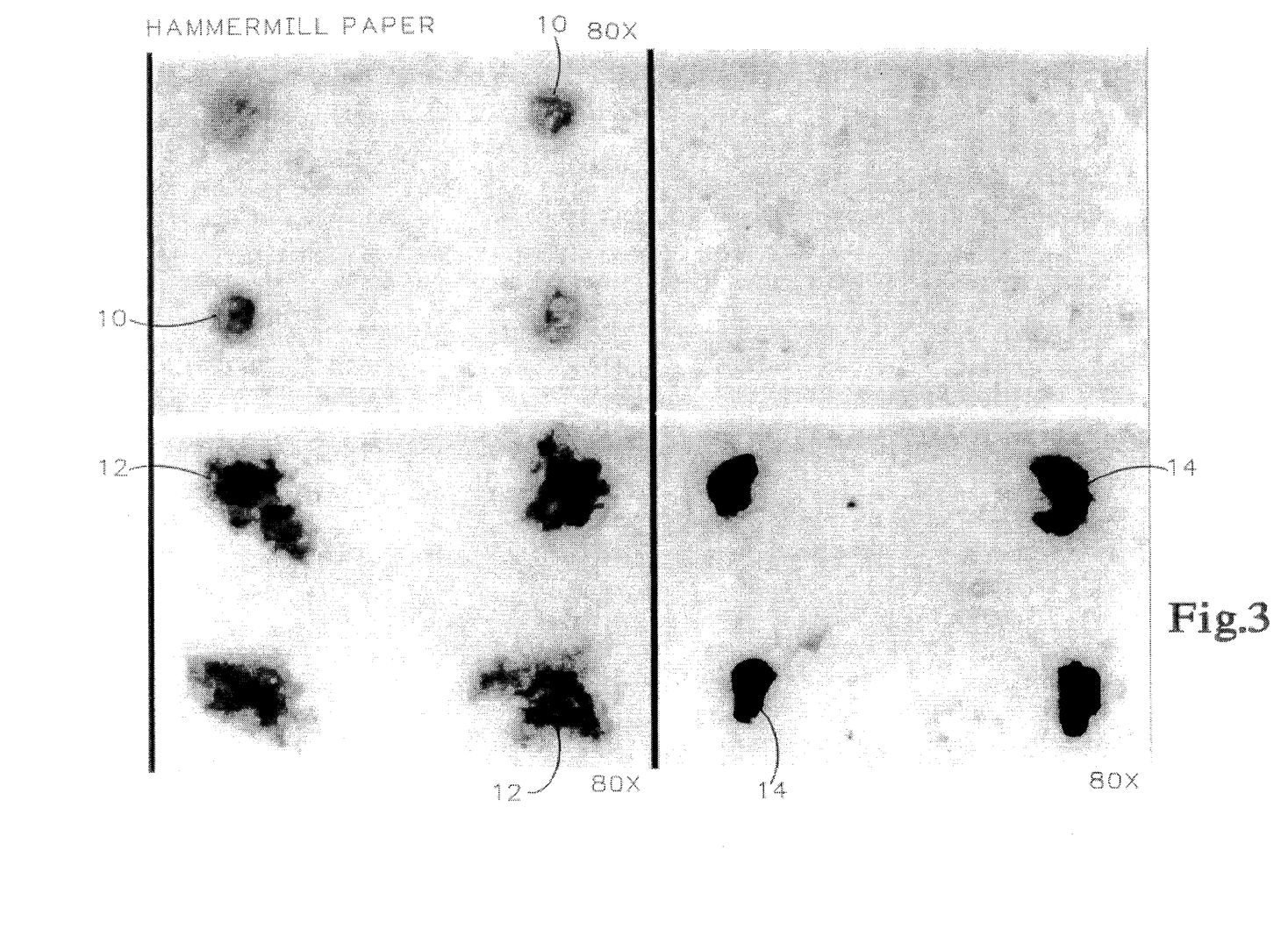
FIG. 3 is a photograph that shows a discreteness comparison of dot patterns formed from an exemplary ink composition of the present invention and from HP1200C cyan and black inks.

FIG. 3 is a photograph that shows the dot patterns 10 from the experimental ink composition and the dot patterns 12 and 14 from Hewlett Packard (HP) 1200C cyan and black inks, respectively. The cyan ink was made using a dye, while the black ink was made using a black pigment which has a higher solids content and therefore has sharper defined dot edges. The ink dots all had about 90 nanograms drop mass and a velocity upon ejection of between about 3–4 meters per second. However, the black pigment is more difficult to use in ink jet applications because of dispersal problems in aqueous solution and nozzle clogging. The discreteness of dots 10 of the experimental ink was better than that of the HP1200C cyan or black ink dots. The dot edges of the test or experimental ink composition were sharper than the HP cyan dye, and feathering was significantly less than both the HP cyan and black inks.

EXAMPLE II

With reference to Table II, test ink solutions A–F of methylcellulose, another hyperthermogelling agent available commercially from The Dow Chemical Company under the trademark METHOCEL cellulose ether (MEC A-15), were prepared in a manner similar to that described for Example I. The structural formula for methylcellulose is shown below:

Preferred MEC homologs have a molecular weight of about 1,000 to about 100,000 where n represents the total number of rings and is any integer that satisfies the molecular weight range.

Figure 4:
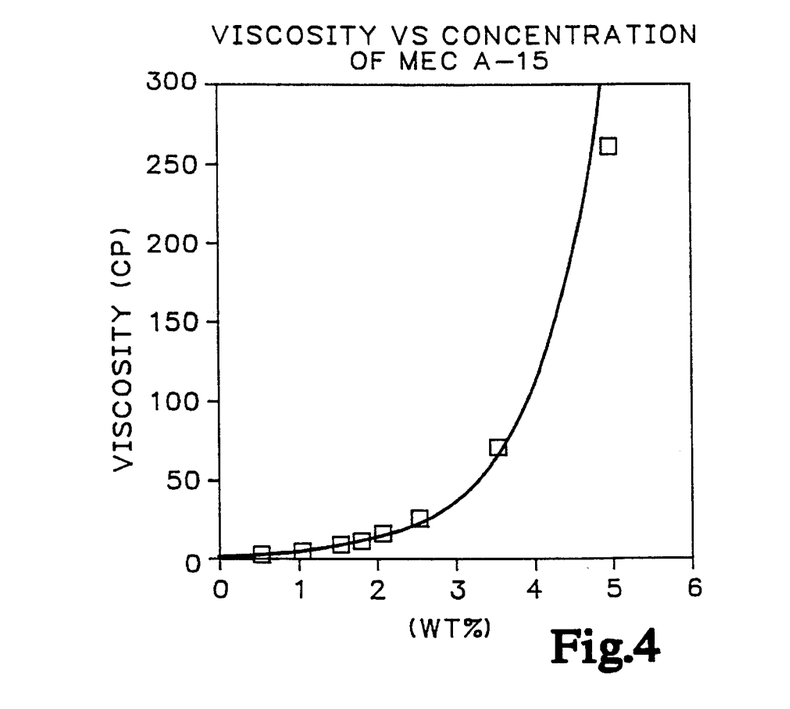
FIG. 4 is a graphical representation of viscosity as a function of concentration of methylcellulose, another hyperthermogelling component.

Acid Blue 9 and Acid Red 52 in Table II represent common dyes and PEG-200 represents polyethylene glycol of molecular weight 200 which acts as a humectant and viscosity modifier. The viscosities of these aqueous solutions are shown in Table II and graphically represented in FIG. 4. Exact surface tension measurements were not conducted for each of the solutions. The surface tension for each was estimated to be between about 48 and about 55 dynes/cm based on the analysis of a base solution without the addition of coloring agents.

The ink solutions were jetted from a 64 nozzle printhead at about 4 kHz of a Tektronix ColorQuick™ aqueous ink jet printer at ambient temperature and generally produced discrete ink dots.

TABLE II

| Solution | Concentration of Components (Wt %) | | | | | |
|---|---|---|---|---|---|---|
| | A | B | C | D | E | F |
| Components | | | | | | |
| MEC A-15 | 0.50 | 0.75 | 0.75 | 1.0 | 1.25 | 1.875 |
| PEG-200 | — | — | — | — | — | 5 |
| Acid Blue 9 | 1.5 | 3.0 | — | 1.5 | 1.5 | 1.5 |
| Acid Red 52 | — | — | 2.5 | — | — | — |
| Viscosity μ(cP) | 2.2 | 3.5 | 3.5 | 4.6 | 6.0 | 12 |

EXAMPLE III

With reference to Table III, test ink solutions A–E of TETRONIC® 1307 surfactant, PEG-200, and Acid Blue 9 were prepared and jetted as described above. Exact surface tension measurements were not conducted for each of the solutions. The surface tension for each was estimated to be between about 38 and about 39 dynes/cm based on the analysis of a base solution without the addition of coloring agents.

The ink solutions formed discrete ink dots.

TABLE III

| Solution | Concentration of Components (Wt %) | | | | |
|---|---|---|---|---|---|
| | A | B | C | D | E |
| Components | | | | | |
| Tetronic 1307 | 6 | 7 | 8 | 10 | 10 |
| PEG-200 | 5 | 5 | 5 | 5 | 10 |
| Acid Blue 9 | 1.5 | 1.5 | 1.5 | 1.5 | 1.5 |
| Viscosity μ(cP) | 5.0 | 6.2 | 8.0 | 12.1 | 15.0 |

EXAMPLE IV

With reference to Table IV, test ink solutions A–C utilizing PLURONIC® F 127 surfactant, PEG-200, and Acid Blue 9 were prepared and jetted as described above. PLURONIC® F surfactant is an ethylene oxide propylene oxide block copolymer available commercially from BASF Corporation of Parsippany, N.J. that has hyperthermogelling properties similar to those of TETRONIC® surfactant. The poly(ethylene oxide-co-propylene oxide) and poly(propylene oxide-co-ethylene oxide) structural formulas for PLURONIC® surfactant respectively are shown below:

Preferred PLURONIC® surfactant homologs have a molecular weight of about 1,000 to about 50,000 and contain about 10% to about 80% poly(oxyethylene) and about 20% to about 60% poly(oxypropylene) where and x and y are integers that satisfy the above weight percent and molecular weight ranges. Exact surface tension measurements were not conducted for each of the solutions. The surface tension for each was estimated to be between about 38 and about 39 dynes/cm based on the analysis of a base solution without the addition of coloring agents. The ink solutions formed discrete dots.

TABLE IV

| Solution | Concentration of Components (Wt %) | | |
|---|---|---|---|
| | A | B | C |
| Components | | | |
| Pluronic F127 | 6 | 7 | 8 |
| PEG-200 | 5 | 5 | 5 |
| Acid Blue 9 | 1.5 | 1.5 | 1.5 |
| Viscosity μ(cP) | 5.0 | 6.2 | 8.0 |

EXAMPLE V

With reference to Table V, test ink solutions A–G of TETRONIC® 1307 surfactant, PEG-200, SAG-47, and different coloring agents were prepared in a manner similar to that described above. SAG-47 is a defoaming agent available from OSI Specialties, Inc., and Acid Yellow 23 is a common coloring agent. Food Black 2 is a common coloring agent for black inks. The ink solutions were jetted on a full array prototype print head having 352 nozzles at 11 kHz. The solutions formed discrete ink dots.

TABLE V

| Solution | Concentration of Components (Wt %) | | | | | | |
|---|---|---|---|---|---|---|---|
| | A | B | C | D | E | F | G |
| Components | | | | | | | |
| Tetronic 1307 | 10 | 10 | 10 | 10 | 10 | 10 | 10 |
| PEG-200 | 10 | 10 | 10 | 10 | 10 | 10 | 10 |
| SAG-47 (ppm) | — | 500 | 250 | 500 | 250 | 20 | 500 |
| Acid Blue 9 | 1.5 | 0.875 | | | | 1.0 | 0.875 |
| Acid Red 52 | | | 1.5 | | | | |
| Acid Yellow 23 | | | | 1.0 | | | |
| Food Black 2 | | | | | 2.0 | | |
| Viscosity μ(cP) | 13 | 11.5 | 12 | 12 | 12 | 11.5 | 11.5 |
| Surface Tension γ(dyne/cm) | 38 | 34 | 38 | 38 | 38 | 34 | 34 |

Some additional compounds that exhibit thermo-inversion behavior similar to TETRONIC® 1307 surfactant are listed in Table VI.

TABLE VI

| Polymers | Thermo-inversion point (Tp+) |
|---|---|
| poly(ethylene oxide) PEO | 95° C. |
| poly(ethylene oxide-co-propylene oxide) PEO-PO (66%) | 50 |
| poly(vinyl Methyl ether) PVME | 30 |
| poly(N-isopropylacrylamide) PIPAAm | 30 |
| poly(methacrylic acid) PMAA | 55 |
| poly(vinyl pyrrolidone) PVP | 140 |
| poly(vinyl alcohol) PVAL | 120 |
| poly(vinyl acetate-co-vinyl alcohol) | |
| PVAC-co-VAL (10%) | 85 |
| PVAC-co-VAL (20%) | 50 |
| PVAC-co-VAL (30%) | 15 |
| PVAC-co-VAL (50%) | 20 |
| PVAC-co-VAL (70%) | −20 |
| poly(vinyl methyl oxazolidone) PVMO | 38 |
| poly(vinyl acetate-co-vinyl pyrrolidone) | 0 |

It is to be noted that numerous concentrations and combinations of these hyperthermogelling components may be employed. Skilled persons in the art will appreciate that a variety of other components that exhibit hyperthermogelling properties may be employed in ink compositions of the present invention. Such components may include, but are not limited to, homopolymers, copolymers, nonpolymeric or nonionic surfactants, naturally occurring polymers and their derivatives.

For example, cellulose derivatives such as hydroxypropyl methyl ether cellulose (HPMEC), shown below, can also be employed:

Preferred HPMEC homologs have a molecular weight of about 1,000 to 100,000 where n represents the total number of rings and is any integer that satisfies the molecular weight range.

Persons skilled in the art will also appreciate that hyperthermogelling components are compatible with a variety of coloring agents and ink additives including suitable dyes and biocides that can be added to the formulations. Skilled persons will also appreciate that hyperthermogelling ink compositions are compatible with variety of drop-on-demand ink jet printing techniques and existing equipment.

For example, a drop of an ink composition containing a hyperthermogelling component may be jetted from a conventional drop-on-demand ink jet printer onto an absorptive substrate such as paper to exploit the concentration-related gelling properties of the hyperthermogelling component. The ink drop will lose water by penetration into paper and by evaporation. This small loss of water will increase the concentration of the gelling compound to result in a rapid increase in viscosity. This viscosity increase will reduce the spreading of the ink dot and make difficult the unwanted excessive penetration of the substrate. The instant viscosity increase will lead to less feathering, sharp dots, and hence, improved print quality. Alternatively, the ink drop may be jetted onto a slightly hydrophobic surface and then transferred to an absorptive substrate.

In an alternative embodiment, the ink drop may be jetted onto a substrate that is warmer than the thermo-inversion point of the ink composition. Contact with the warm substrate will instantly gel the ink drop. Alternatively, the ink drop may be jetted onto a surface having a temperature below the thermo-inversion point of the ink composition and then transferred to a warmer substrate.

Similarly, a hyperthermogelling ink composition may be formulated to have a thermo-inversion point at ambient temperature, e.g. 25° C. Such an ink composition could be jetted as a liquid below ambient temperature and would gel instantly after contacting the substrate.

It should be noted that the gel ink formulations of the present invention are porous solids that involve a continuous matrix as their "solid" element. This continuous matrix or skeletal network provides the gel system with the required mechanical stability and coherence.

Gels generally are cross-linked polymer swollen networks in a liquid medium that possess both the cohesive properties of solids and the diffusive transport properties of liquids. Elastically, gels tend to be soft, and are highly osmotically active. The gel ink formulations of the present invention are based on water and therefore incorporate some of water's unique properties, especially the facility for ionization that an aqueous environment provides because of the weak physical cross-linking from hydrogen bonds and hydrophobic interactions.

The particular gel ink formulations of the bonds holding the gel network together can "make-and-break". These reversible gel ink formulations are formed between clusters of hydrophobic groups, such as propylene oxide. The clusters can be a copolymer, such as ethylene oxide propylene oxide copolymer, or may be simply a homopolymer, such as methylether cellulose.

It will be apparent to skilled persons that many changes may be made to the details of the specific embodiments of the invention described herein without departing from the underlying principles thereof. The scope of the present invention should accordingly be determined only by the following claims.

What is claimed is:

1. An aqueous phase change ink composition, comprising:

a coloring agent; and an amount of hyperthermogelling component in a concentration such that the ink composition is in a liquid state at a first temperature and is in a solid state at a second temperature where the second temperature is greater than the first temperature, the hyperthermogelling component comprising a formula selected from the group consisting of:

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000;

-continued and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000; and and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

2. The ink composition of claim 1 in which the hyperthermogelling component has a thermo-inversion point between about −20° C. to about 140° C.

3. The ink composition of claim 1 in which the hyperthermogelling component forms a stable gel at the second temperature.

4. The ink composition of claim 1 in which the hyperthermogelling component comprises a nonionic polymer.

5. The ink composition of claim 1 having a concentration of the hyperthermogelling component between about 0.05% by weight and to about its critical concentration.

6. A method of printing a hyperthermogelling aqueous phase change ink composition on a printing surface, comprising:

jetting the hyperthermogelling aqueous phase change ink composition from a drop-on-demand ink jet printer onto the printing surface, the ink composition having an amount of a hyperthermogelling component in a first concentration such that the ink composition is in a liquid state;

increasing the concentration of the hyperthermogelling component in the ink composition by having water in the ink composition penetrate the printing surface or being evaporated so that the ink composition forms a stable gel, and the printing surface further comprising an absorptive substrate where water from the ink composition penetrates the absorptive substrate to increase the concentration of the hyperthermogelling component.

7. A method of printing a hyperthermogelling aqueous phase change ink composition on a printing surface, comprising:

jetting the hyperthermogelling aqueous phase change ink composition from a drop-on-demand ink jet printer onto the printing surface, the ink composition having an amount of a hyperthermogelling component in a first concentration such that the ink composition is in a liquid state; and increasing the concentration of the hyperthermogelling component in the ink composition by the printing surface further comprising a hydrophobic substrate so that when the ink composition is transferred to an absorptive substrate water from the ink composition penetrates the absorptive substrate to increase the concentration of the hyperthermogelling component.

8. The method of claim 6 in which the ink composition has a thermo-inversion point and is heated to the thermo-inversion point to form a stable gel.

9. The method of claim 8 in which the printing surface has a temperature that is greater than or equal to the thermo-inversion point.

10. The method of claim 8 in which the printing surface has a lower temperature than the thermo-inversion point and in which the ink composition is transferred from the printing surface to a substrate having a temperature that is greater than or equal to the thermo-inversion point.

11. The method of claim 6 in which the ink composition has a thermo-inversion point at ambient temperature and in which the ink composition is cooled to facilitate jetting.

12. The method of claim 6 in which the hyperthermogelling component has a thermo-inversion point between about −20° C. to about 140° C.

13. The method of claim 6 in which the hyperthermogelling component forms a stable gel at the thermo-inversion point.

14. The method of claim 6 in which the hyperthermogelling component comprises a nonionic polymer.

15. The method of claim 6 in which the hyperthermogelling component comprises the formula:

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

16. The method of claim 6 in which the hyperthermogelling component comprises the formula:

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

17. The method of claim 6 in which the hyperthermogelling component comprises the formula:

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

18. The method of claim 6 in which the hyperthermogelling component comprises the formula:

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

19. The method of claim 6 in which the hyperthermogelling component comprises the formula:

and the hyperthermogelling component has a molecular weight range of about 1,000 to about 100,000.

20. The method of claim 6 in which the hyperthermogelling component comprises the formula:

where n represents the total number of rings and is any integer that satisfies the molecular weight range and the hyperthermogelling component has a molecular weight range of about 1,000 to about 100,000.

21. The method of claim 6 having concentration of the hyperthermogelling component between about 0.05% by weight and to about its critical concentration.

22. The ink composition of claim 1 in which the hyperthermogelling component includes a hydrophobic moiety and a hydrophilic moiety.

23. The method of claim 7 in which the ink composition has a thermo-inversion point and is heated to the thermo-inversion point to form a stable gel.

24. The method of claim 23 in which the printing surface has a temperature that is greater than or equal to the thermo-inversion point.

25. The method of claim 23 in which the printing surface has a lower temperature than the thermo-inversion point and in which the ink composition is transferred from the printing surface to a substrate having a temperature that is greater than or equal to the thermo-inversion point.

26. The method of claim 7 in which the ink composition has a thermo-inversion point at ambient temperature and in which the ink composition is cooled to facilitate jetting.

27. The method of claim 7 in which the hyperthermogelling component has a thermo-inversion point between about −20° C. to about 140° C.

28. The method of claim 7 in which the hyperthermogelling component forms a stable gel at the thermo-inversion point.

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

31. The method of claim 7 in which the hyperthermogelling component comprises the formula:

and contains about 10% to about 80% poly(oxyethylene) and about 20% to about 60% poly(oxypropylene) where x and y are any integers that satisfy the weight percent and molecular weight ranges and the hyperthermogelling component has a molecular weight range of about 1,000 to about 50,000.

32. The method of claim 7 in which the hyperthermogelling component comprises the formula:

29. The method of claim 7 in which the hyperthermogelling component comprises a nonionic polymer.

30. The method of claim 7 in which the hyperthermogelling component comprises the formula:

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

33. The method of claim 7 in which the hyperthermogelling component comprises the formula:

and contains about 10% to about 80% poly(oxyethylene) and about 20% to about 60% poly(oxypropylene) where w is an integer from 2 to 6 and x and y are any integers that satisfy the weight percent and molecular weight ranges and the hyperthermogelling component has a molecular weight range of about 1,000 to about 50,000.

34. The method of claim 7 in which the hyperthermogelling component comprises the formula:

and the hyperthermogelling component has a molecular weight range of about 1,000 to about 100,000.

35. The method of claim 7 in which the hyperthermogelling component comprises the formula:

where n represents the total number of rings and is any integer that satisfies the molecular weight range and the hyperthermogelling component has a molecular weight range of about 1,000 to about 100,000.

36. The method of claim 7 having concentration of the hyperthermogelling component between about 0.05% by weight and to about its critical concentration.

* * * * *